United States Patent Office 3,578,668
Patented May 11, 1971

3,578,668
1-AMINOALKYLAMINO-BENZO[b] QUINOLIZINES
Richard A. Schnettler, Milwaukee, and John T. Suh, Mequon, Wis., assignors to Colgate-Palmolive Company, New York, N.Y.
No Drawing. Filed Aug. 26, 1968, Ser. No. 755,427
Int. Cl. C07d 39/12
U.S. Cl. 260—288     5 Claims

ABSTRACT OF THE DISCLOSURE

The compounds are 1-alkylamino-benzo[b]quinolizines which are useful as antihypertensive agents and central nervous system stimulants and as intermediates in the preparation of pickling agents, wood preservatives and mothproofing agents. Representative of the compounds disclosed are 1-(N-cyclohexylaminoethyl)-1,3,4,6,11,11a-hexahydro-2H-benzo[b]quinolizine and 1-(dimethylaminoethyl)-1,3,4,6,11,11a - hexahydro-2H-benzo[b]quinolizine.

DESCRIPTION OF THE INVENTION

The compounds of the present invention may be represented by the following formula:

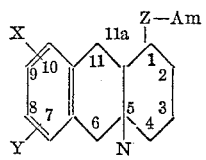
(I)

wherein X and Y are of the same or different members selected from hydrogen, hydroxy, a halogen such as bromo, chloro or fluoro, a lower alkoxy of 1 to 4 carbon atoms such as methoxy, ethoxy or propoxy or trifluoromethyl; Z is a single chemical bond, a lower alkylene of 1 to 4 carbon atoms such as methylene, ethylene or isopropylene or the group —NH—$(CH_2)_n$— in which $n$ is a whole number of 1 to 4, and Am is

where $R_1$ and $R_2$ are the same or different and are selected from hydrogen, a lower alkyl of 1 to 4 carbon atoms such as methyl, ethyl, isopropyl or butyl, phenyl, a substituted phenyl, especially a halogen-substituted phenyl such as p-chlorophenyl and o-chlorophenyl, a lower alkoxy-substituted phenyl such as p-methoxyphenyl, a phenyl-lower alkyl of 7 to 13 carbon atoms such as benzyl, phenylethyl, phenylisopropyl or phenylbutyl, a cycloalkyl containing 3 to 7 carbon atoms such as cyclopropyl, cyclopentyl and cyclohexyl and cycloalkyl-lower alkyl groups in which the cycloalkyl contains 3 to 7 carbon atoms such as cyclopentyl-methyl and cyclohexyl-ethyl, provided, however, $R_1$ and $R_2$ cannot be both hydrogen when X and Y are hydrogen, and Z is a single bond, or Am represents a cyclic amino group such as piperazino, N-lower alkyl piperazino, especially 4-methyl-piperazino, N-hydroxy-lower alkyl piperazino, especially N-hydroxyethyl piperazino, N-aralkylpiperazino such as N-benzyl piperazino, pyrrolidino and piperidino.

The basic starting materials for the preparation of the novel compounds of the present invention are 3,4,11,11a-tetrahydro-2H-benzo[b]quinolizin-1(6H)-one of the following formula:

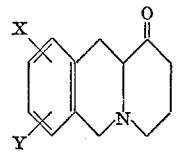
(II)

in which X and Y are as previously defined. These compounds are known or can be prepared by known methods. (See S. Archer, J. Org. Chem., 16, 430 (1951).) Representative of these compounds are the following:

8,9-dimethoxy-3,4,11,11a-tetrahydro-2H-benzo[b] quinolizin-1(6H)-one,
8,9-dihydroxy-3,4,11,11a-tetrahydro-2H-benzo[b] quinolizin-1(6H)-one,
8-chloro-3,4,11,11a-tetrahydro-2H-benzo[b]quinolizine-1(6H)-one,
9-chloro-3,4,11,11a-tetrahydro-2H-benzo[b]quinolizin-1(6H)-one,
8-fluoro-3,4,11,11a-tetrahydro-2H-benzo[b]quinolizin-1(6H)-one,
9-fluoro-3,4,11,11a-tetrahydro-2H-benzo[b]quinolizin-1(6H)-one,
8-trifluoromethyl-3,4,11,11a-tetrahydro-2H-benzo[b] quinolizin-1(6H)-one,
9-trifluoromethyl-3,4,11,11a-tetrahydro-2H-benzo[b] quinolizin-1(6H)-one, and
3,4,11,11a-tetrahydro-2H-benzo[b]quinolizin-1(6H)-one.

In the preferred practice of the present invention compounds of the formula

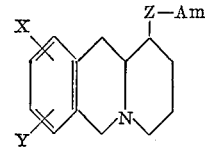

in which Z is —NH—$(CH_2)_n$— are prepared by dissolving the desired ketone starting material in benzene or a suitable solvent to which is added the desired secondary amine. The mixture is then heated to reflux for approximately two hours, the benzene distilled off and the crude product dissolved in methanol to which sodium borohydride is added. The resulting mixture is then stirred at room temperature until the reaction is complete, usually two hours, the solvent evaporated and the residue purified by conventional means such as solvent extraction to yield the desired 1-alkylamino-benzo[b]quinolizines. The described process may be illustrated as follows:

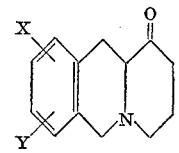

[H] ↓ $NH_2$—$(CH_2)_n$—Am

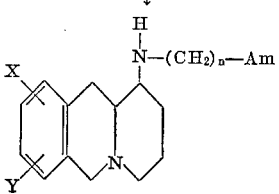
(III)

in which the symbols X, Y, Am and $n$ are as previously described and do not partake in or interfere with the reaction. Representative of the compounds which may be prepared by this process are 1-(N,N-dimethylaminopropylamino)-1,3,4,6,11,11a-hexahydro-2H-benzo[b]-quinolizine,
1-(N,N-dimethylaminoethylamino)-1,3,4,6,11,11a-hexahydro-2H-benzo[b]-quinolizine,
1-(3,4-dimethoxyphenethylamino)-1,3,4,6,11,11a-hexahydro-2H-benzo[b]-quinolizine.

Representative of the amines that can be used to prepare the compounds of the present invention are the following:

dimethylaminopropylamine,
dimethylaminoethylamine,
diethylaminopropylamine,
diethylaminoethylamine,
dibenzylaminopropylamine,
dibenzylaminoethylamine,
N-benzyl-N-methylaminopropylamine,
N-benzyl-N-methylaminoethylamine,
N-p-chlorophenyl-N-methylaminopropylamine,
N-dimethoxyphenyl-N-methylaminoethylamine,
N-cyclopropyl-N-methylaminopropylamine.

These amines are known compounds which are commercially available.

The compounds of the formula

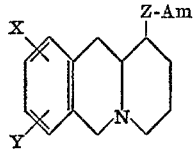

in which Z is a single chemical bond are preferably prepared by reacting a ketone of Formula II and a suitable amine dissolved in a mutual solvent such as toluene and allowing the resulting base to react with sodium borohydride. The process may be illustrated as follows:

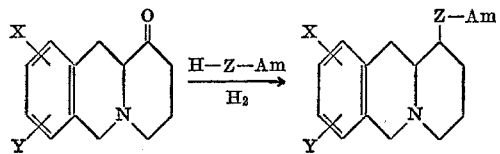

in which X and Y are as described and Z is a single chemical bond.

Representative of the amines which may be employed in the described process are the following:

benzylamine,
isopropylamine,
ethylamine,
methylamine,
butylamine,
cyclohexylamine,
cyclopropylamine,
p-chlorophenethylamine,
3,4-dimethoxyphenethylamine,
3,4-dimethoxybenzylamine,
pyrrolidine,
N-4-methylpiperazine,
piperazine,
N-hydroxyethyl-piperazine, and
p-chlorobenzylamine.

Representative of the compounds which may be prepared in the described manner are:

1-benzylamino-8,9-dimethoxy-1,3,4,6,11,11a-hexahydro-2H-benzo[b]-quinolizine,
1-benzylamino-1,3,4,6,11,11a-hexahydro-2H-benzo[b]-quinolizine,
1-(N-isopropylamino)-1,3,4,6,11,11a-hexahydro-2H-benzo[b]-quinolizine,
1-pyrrolidino-1,3,4,6,11,11a-hexahydro-2H-benzo[b]-quinolizine,
1-(3,4-dimethoxyphenethylamino)-1,3,4,6,11,11a-hexahydro-2H-benzo[b]-quinolizine.

Compounds of the formula

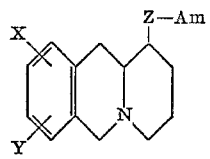

in which Z is lower alkylene may be prepared by treating a ketone of Formula II with diethyl cyanomethylphosphonate in the presence of sodium hydride, preferably in an ice bath. Upon removal of the solvent the corresponding cyanomethylidene derivative is obtained which can in turn be catalytically reduced to yield the corresponding acetonitrile which upon treatment with lithium aluminum hydride will yield the corresponding primary amine. The primary amine can be converted by a variety of known techniques to secondary and tertiary amines. For example, the primary amine upon treatment with a formic acid and formaldehyde mixture forms the corresponding dimethylamine. The above described process may be illustrated as follows:

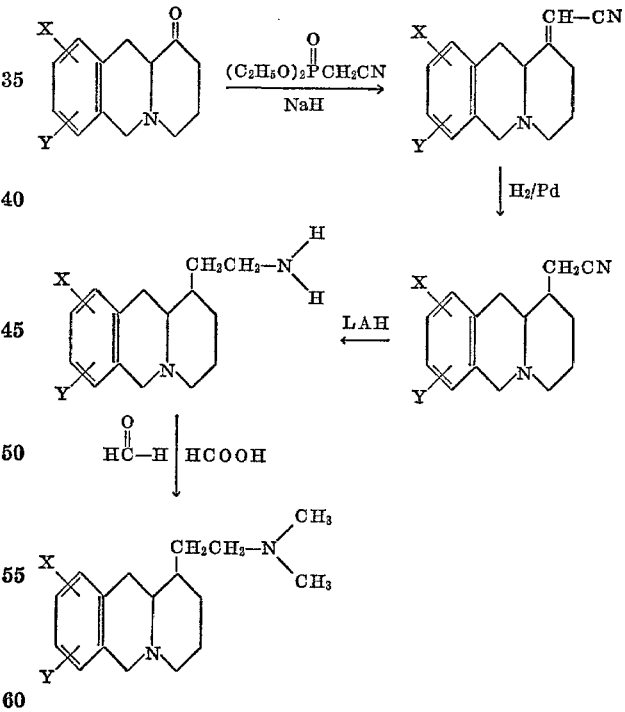

wherein X and Y are as previously defined and do not interfere with or partake in the reaction.

The primary amines in which Z is an alkylene higher than ethylene may be prepared by treating the next lower cyanoalkyl derivative with a lower alkanol such as ethanol in the presence of a suitable catalyst such as hydrochloric acid to form the corresponding ethyl ester, treating that compound with LAH to form the alcohol, treating the alcohol with tosyl chloride in a suitable solvent such as pyridine to form the tosylate and finally treating the tosylate with sodium cyanide to form the nitrile. The resulting nitrile can, of course, be reduced to the corresponding primary amine or used as a starting material to prepare the next higher homolog.

The process may be illustrated as follows:

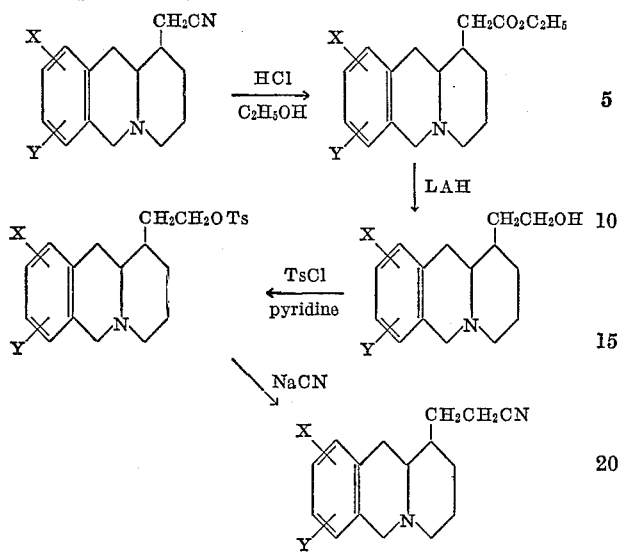

in which X and Y are as previously defined and do not interfere in the reaction.

The novel amines of the present invention may be readily converted to acid addition salts by treating the amine base with a suitable organic or inorganic acid in a mutual solvent. Representative of the acids which may be used to form addition salts are hydrochloric, phosphoric, sulphuric, maleic acid, citric, ascorbic, methanesulfonic and succinic acid. These acid addition salts may also be used as a means of freeing the free base from otherwise difficult to remove impurities. The amines of the invention as well as their acid addition salts possess pharmaceutical utility as central nervous system stimulants.

In behavioral screening tests in mice the compound 1-(N,N-dimethylaminoethylamino) - 1,3,4,6,11,11a-hexahydro-2H-benzo[b]quinolizine produced a marked central nervous system stimulation. The behavior of mice receiving 300 mg./kg. of the compound intraperitoneally in the form of a 5% acacia suspension was characterized by increased awareness and indications of mood elevation. As a result of the behavioral test the compound was found to have an $LD_{50}$ of 400 mg./kg. The behavioral tests were conducted in accord with the procedure set forth by Irwin in "Animal and Clinical Pharmacologic Techniques in Drug Evaluation," J. H. Nodine and P. E. Siegler, Ed. Year Book Publishers, Inc., 1964, pp. 36–54. The compound 1-(N-methylaminoethyl) - 1,3,4,6,11,11a-hexahydro-2H-benzo[b]quinolizine was found to be effective in lowering blood pressure significantly (60–90 mm.) in the standard anesthetized, vagotomized cat preparation when administered in 10 mg./kg. doses intravenously. The compound 1-(2-aminoethyl)-1,3,4,6,11,11a - hexahydro-2H-benzo[b]-quinolizine was found to also be effective in similar experiments employing anesthetized, vagotomized dog preparations at the same dose.

When intended for pharmaceutical use the compounds or their acid addition salts are preferably combined with one or more suitable pharmaceutical diluents or additives and formed into unit dosage forms for oral or parenteral administration such as tablets, capsules or solutions. The pharmaceutical diluents which may be employed may be either solids such as starch, talc or sugar or liquid such as water or propylene glycol.

The unit dosage forms may contain a concentration of 0.1% to about 10% or more by weight of the active ingredients. Generally such dosage forms will contain about 5 to 150 mg. of the active ingredients.

The compounds of the invention may also be used for other purposes. For example, the thiocyanic acid addition salts of the novel amines when condensed with formaldehyde form resinous materials useful as pickling agents according to U.S. Pats. 2,425,320 and 2,606,155.

The compounds also form fluosilicic acid addition salts which are useful as mothproofing or wood preserving agents according to U.S. Pats. 1,915,334 and 2,075,359.

The amines of the present invention may also be used in the purification of penicillin. The amines form solids which have soluble characteristics which cause them to be useful in the purification and isolation of benzo penicillin from other related compounds.

The following examples are presented to illustrate this invention:

EXAMPLE 1

8,9-dimethoxy-3,4,11,11a-tetrahydro-2H-benzo[b]quinolizin-1(6H)-one

To 50 ml. toluene is added 12.0 g. (0.0317 mole) ethyl N-(γ-carbethoxypropyl) - 6,7 - dimethoxy-1,2,3,4-tetrahydroisoquinoline-3-carboxylate and 2.4 g. (0.1 mole) sodium hydride. The mixture is stirred at reflux for 2 hours during which time the sodium enolate precipitates from the solution. The system is cooled and water is added in excess until a fine suspension is obtained. This is collected and dried on the filter to give a yellow solid. The enolate ester (6.1 g., 0.017 mole) is dissolved in 45 ml. 4 N hydrochloric acid and heated on a steam bath until the solution no longer exhibits a positive $FeCl_3$ test (dark purple). The solution is cooled, and saturated with sodium chloride, and made basic with concentrated ammonia solution at which point a yellow precipitate is obtained. This precipitate is collected, dried on the filter, and recrystallized from benzene to yield 8,9-dimethoxy-3,4,11,11a-tetrahydro-2H-benzo[b]quinolizin-1(6H)-one, M.P. 152–155°.

EXAMPLE 2

3,4,11,11a-tetrahydro-2H-benzo[b]quinolizin-1(6H)-one hydrochloride

Ethyl 3,4,11,11a - tetrahydro - 2H-benzo[b]-quinolizin-1(6H)-one-2-carboxylate (31.3 g., 0.115 mole) is suspended in 400 ml. 6 N hydrochloric acid and heated to 90° C. with efficient stirring until the solution exhibits a negative ferric chloride test (2 hours). The solvent is distilled in vacuo until 50% is removed at which point the system is cooled overnight. The solid is collected on the filter to give the hydrated hydrochloride, M.P. 212° C. The mother liquor is concentrated to dryness, dissolved in a minimum of ethanol and diluted with an equal volume of ethyl acetate. The unhydrated salt, 3,4,11,11a-tetrahydro-2H-benzo[b]-quinolizin-1(6H)-one hydrochloride, which crystallizes has a melting point of 220° C.

EXAMPLE 3

1-(N,N-dimethylaminopropylamine)-1,3,4,6,11,11a-hexahydro-2H-benzo[b]-quinolizine A mixture of 3,4,11,11a-tetrahydro-2H-benzo[b]-quinolizin-1(6H)-one (5.0 g., 0.0196 mole) and 10.2 g. (0.1 mole) dimethylaminopropylamine in 50 ml. benzene is heated to reflux for 2 hours, benzene distilled and crude product dissolved in 50 ml. methanol and 3.7 g. (0.1 mole) sodium borohydride is added. The mixture is stirred at room temperature for 2 hours, methanol evaporated and residue dissolved in dilute HCl, made basic with $K_2CO_3$, extracted into ether, washed with water and dried. Removal of the solvent gives 1-(N,N-dimethylaminopropylamine)-1,3,4,6,11,11a-hexahydro-2H-benzo[b]-quinolizine as an oil which distills at 150°/0.07 mm. Hg.

*Analysis.*—Calcd. for $C_{18}H_{29}N_3$ (percent): C, 75.02; H, 10.17; N, 13.90. Found (percent): C, 75.31; H, 9.93; N, 13.90.

EXAMPLE 4

1-(N,N-dimethylaminoethylamino)-1,3,4,6,11,11a-hexahydro-2H-benzo[b]-quinolizine A mixture of 7.0 g. (0.0274 mole) 3,4,11,11a-tetrahydro-2H-benzo[b]-quinolizin-1(6H)-one and 8.8 g. (0.1 mole) dimethylaminoethylamine are dissolved in 50 ml. benzene and heated to reflux for 2 hours. The solvent is evaporated and the residue dissolved in 100 ml. 0.3 N HCl, made basic with potassium carbonate, extracted into ether and dried. The solvent is evaporated to give a yellow oil. This is distilled to give 1-(N,N-dimethylaminoethylamino) - 1,3,4,6,11,11a - hexahydro-2H-benzo[b]-quinolizine, B.P. 150°/0.07 mm. Hg.

Analysis.—Calcd. for $C_{17}H_{27}N_3$ (percent): N, 15.37. Found (percent): N, 14.81.

We claim:

1. A compound selected from compounds of the formula

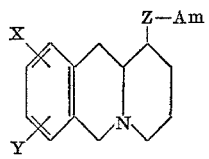

in which X and Y are hydrogen, hydroxy, halogen, lower alkoxy or trifluoromethyl, Z is $-NH-(CH_2)_n-$ in which $n$ is 1 to 4, and Am is

in which $R_1$ and $R_2$ are selected from hydrogen lower alkyl, and phenyl-lower alkyl of 7 to 13 carbon atoms, of and nontoxic acid addition salts thereof.

2. A compound of claim 1 in which X and Y are hydrogen.

3. A compound of claim 1 in which X and Y are hydrogen, chloro, trifluoromethyl or methoxy.

4. A compound of claim 1 in which X and Y are hydrogen, $n$ is 3 and $R_1$ and $R_2$ are methyl.

5. A compound of claim 1 in which X and Y are hydrogen, $n$ is 2 and $R_1$ and $R_2$ are methyl.

References Cited

UNITED STATES PATENTS

| 3,101,338 | 8/1963 | Robinson | 260—288X |
| 3,408,352 | 10/1968 | Harotmann | 260—288 |

OTHER REFERENCES

Kupchan et al.: Abstracted in Chem. Abstr., vol. 65, col. 3833 (1966).

DONALD G. DAUS, Primary Examiner

U.S. Cl. X.R.

260—239.1, 286, 287, 288, 268, 940; 424—258